United States Patent [19]
Paykin et al.

[11] Patent Number: 5,974,910
[45] Date of Patent: Nov. 2, 1999

[54] ACCUMULATOR PISTON

[75] Inventors: Alex Paykin, Buffalo Grove; David Dobbs, Elgin, both of Ill.

[73] Assignee: SKF USA Inc., Elgin, Ill.

[21] Appl. No.: 08/967,790

[22] Filed: Nov. 10, 1997

[51] Int. Cl.$^6$ .................. F16H 57/02; F16J 9/00
[52] U.S. Cl. ................ 74/606 R; 92/241; 92/240; 92/107
[58] Field of Search .................. 74/606 R; 92/240, 92/241, 107, 85 A, 85 B, 18, 183

[56] References Cited

U.S. PATENT DOCUMENTS

| | | | |
|---|---|---|---|
| 2,181,900 | 12/1939 | Langdon | 92/240 |
| 3,103,991 | 9/1963 | Flinn | 188/77 |
| 3,183,795 | 5/1965 | Kirk | 92/212 |
| 3,557,911 | 1/1971 | Ellard | 188/77 |
| 3,814,226 | 6/1974 | White | 92/85 |
| 4,417,503 | 11/1983 | Izumi | 92/240 |
| 4,635,778 | 1/1987 | Lederman . | |
| 4,881,453 | 11/1989 | Armstrong | 92/84 |
| 4,987,796 | 1/1991 | Von Kaler et al. | 94/606 R |
| 5,014,599 | 5/1991 | Kocsis et al. | 92/84 |
| 5,492,053 | 2/1996 | Stonehill . | |

OTHER PUBLICATIONS

1992 AOD–E Transmission Theory and Diagnosis; Ford Parts and Service Division Technical Training; Sep., 1991; pp. 10 and 42.
Publication Unknown; 2 Sheets Attached; pp. 60 and 61.

*Primary Examiner*—Vinh T. Luong
*Attorney, Agent, or Firm*—James T. Fitzgibbon; Vedder, Price, Kaufman & Kammholz

[57] ABSTRACT

An accumulator piston for an automatic transmission. The piston comprises two components, the first and second being cup elements welded together with their closed ends in abutting relation. The lower cup includes a curled back portion with a radial flange having an axially extending bi-directional oil seal thereon, and spaced apart recesses in the curled back portion to permit oil to flow therein. The upper cup includes a radial flange of reduced diameter compared to the lower cup flange. The flange also has a lip seal thereon. The piston is spring-loaded and moves up and down in a bore and counterbore in response to fluid flow on either side of the piston to absorb shifting shocks.

17 Claims, 3 Drawing Sheets

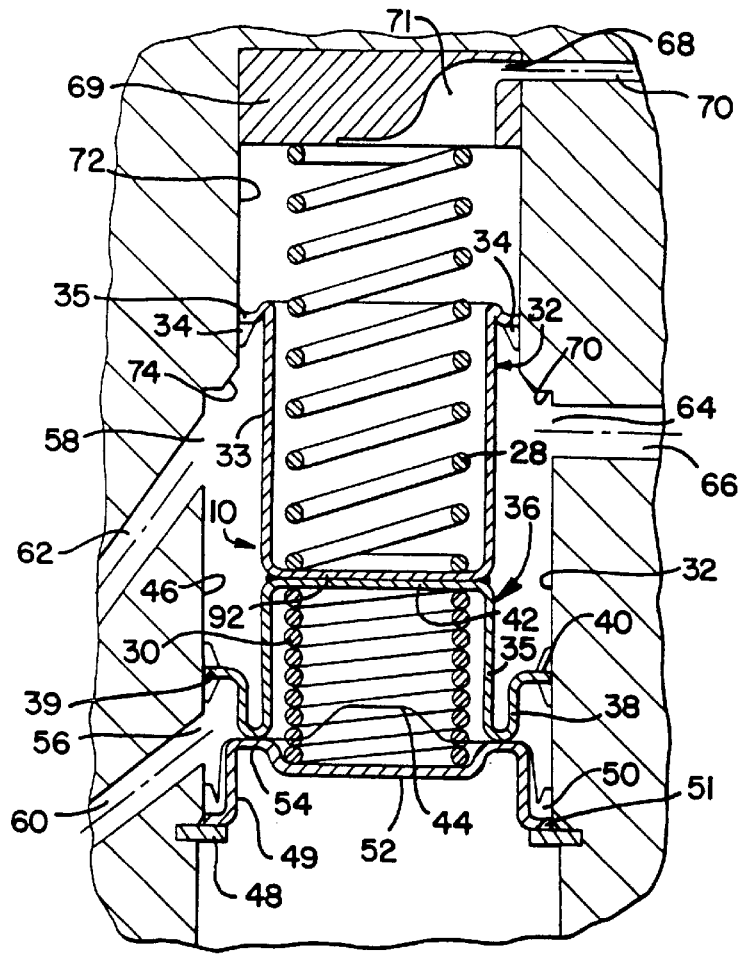
FIG. 2
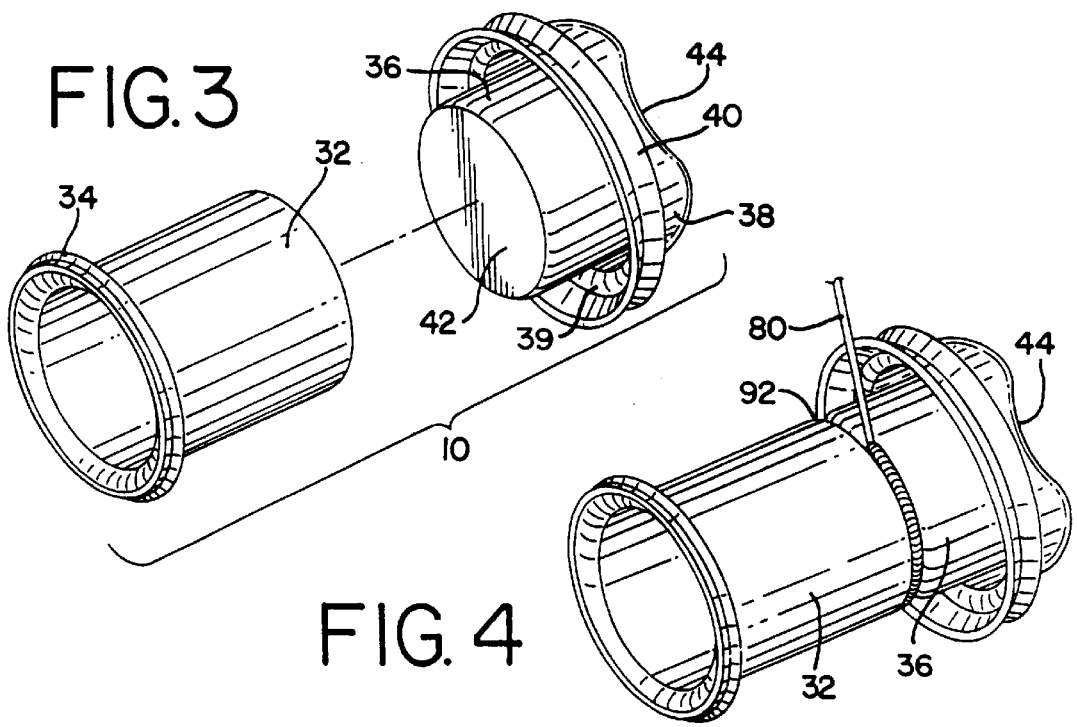
FIG. 3
FIG. 4

ACCUMULATOR PISTON

BACKGROUND OF THE INVENTION

The present invention relates generally to automatic transmissions, and more particularly, to an accumulator piston used therein. Specifically, the invention relates to an improved so-called 1-2 accumulator piston, which is made and assembled into one piece from two pieces, and which includes two seals bonded to the piston. This arrangement is advantageous from the standpoints of simplicity, reliability, and installation in the intended application.

As currently manufactured, one form of the 1-2 accumulator piston includes two O-rings as the seal. By switching to a welded component having two deep-drawn cups separately formed and then butt-welded together, with the seals being bonded on to the stampings or casings, an improved product is made.

Basically, the 1-2 accumulator piston in prior art transmissions has either been an aluminum casting or forging or a plastic piston. In the case of the aluminum casting or forging, two loose lip seals or O-rings were used. In the case of the plastic piston, two loose lip seals or O-rings were also provided. The aluminum casting approach had the disadvantage of being more expensive, because of the machining required on several surfaces. The aluminum casting, in addition, was heavier and in some cases less accurately machined. The loose lip seals were not as durable as bonded seals. In addition, the problem of a fit in the bore was presented. A machined aluminum casting or forging with loose O-ring seals had the further disadvantage of galling in the steel or aluminum bore formed in the housing.

In the case of plastic, the strength was questionable as regards the piston. This shortcoming was particularly apparent over the life of the product, which could easily exceed 100,000 miles or perhaps, even two or three times that amount. Prior art plastic cups simply did not have the potential life expectancy of a more substantial piston. The invention does away with the need of O-ring or other loose lip seals, replacing them with bonded seals having several advantages.

A one-step assembly process is possible with the design, which includes a major diameter flange on one cup and a smaller diameter flange on the other cup, with the two cups being deep drawn and welded together at the interface. The resulting metal piston is much stronger than prior art designs, it is lighter, more durable, and less expensive.

In view of the failure of the prior art to develop an accumulator piston of an advantageous type, it is an object of the present invention to provide an improved accumulator piston.

Another object of the present invention is to provide a one-piece component in place of components having O-rings or other loose-fitting seals.

Yet another object of the present invention is to provide a bonded accumulator piston and seal unit requiring no additional assembly operations by the end user, that is, the labor force at the automatic transmission assembly point.

Still another object of the invention is to make housekeeping easier for the user, in the sense of taking up less warehouse space with separate components requiring assembly and subsequent fitting.

It is a further object of the invention to provide an element which, in use, will avoid undue pinching of rubber elements. In this connection, a dual molded lip is more durable and less likely to be torn or otherwise damaged in use than are O-rings.

In particular, it is an object of the invention to locate the seals on the part where they will not engage the ports or openings in the bores during the assembly process.

A still further object of the invention is to provide a piston wherein scoring or galling of the running surfaces can be avoided, particularly those where there would be metal-to-metal contact in the event of misalignment in either aluminum or steel housings. By way of explanation, when a non-bonded O-ring moves in the groove in which it is located, it eventually becomes torn or breaks down. Metal-to-metal contact then occurs. This occurs with every non-bonded O-ring. When there is misalignment, wear is accelerated.

An additional object of the invention is to provide reduced stresses and strains and increased fatigue life over the expected life of the unit.

Yet another object of the invention is to provide a lower cost assembly compared with an aluminum forging or casting.

Still another object of the invention is to provide easier installation than is attainable with constructions containing O-rings.

More specifically, another object is to avoid the presence of O-rings, which, during installation, and thereafter, are more easily cut by the passages in the bores, creating questionable installation reliability.

A further object of the invention is to avoid scuffing and galling of the parts relative to each other.

A still further object of the invention is to do away with scuffing of the bore surface by reason of having rubber-to-metal contact rather than aluminum-to-steel contact in the area of the bores or, in the alternative, with aluminum-to-aluminum to contact in the bore.

The above advantages of the invention are achieved in practice by providing a bonded piston, preferably laser welded and made from two deep draws, with the open sides of the draws being directed oppositely and with each end portion of the piston having its own associated seal bonded thereto.

The exact manner in which the foregoing invention is achieved in practice will become more clearly apparent when reference is made to the following detailed description of the invention set forth by way of example and shown in the accompanying drawings, in which like reference numbers indicate corresponding parts throughout.

BRIEF DESCRIPTION OF THE DRAWINGS

FIG. 2 is a vertical sectional view, on a greatly enlarged scale, taken along lines 2—2 of FIG. 1 and showing the bonded 1-2 accumulator piston in position of use, and showing the sources of hydraulic fluid and the ports served thereby;

FIG. 3 is an exploded perspective view, showing one form of the piston of the invention and showing the same before assembly.

FIG. 4 is a view showing the laser-type welding being accomplished so as to join the abutted faces of the piston cups together;

DESCRIPTION OF THE PREFERRED EMBODIMENTS OF THE INVENTION

While the invention may comprise several aspects, and may take on several forms in use, several presently preferred embodiments of the invention will be discussed below.

Figure 1:
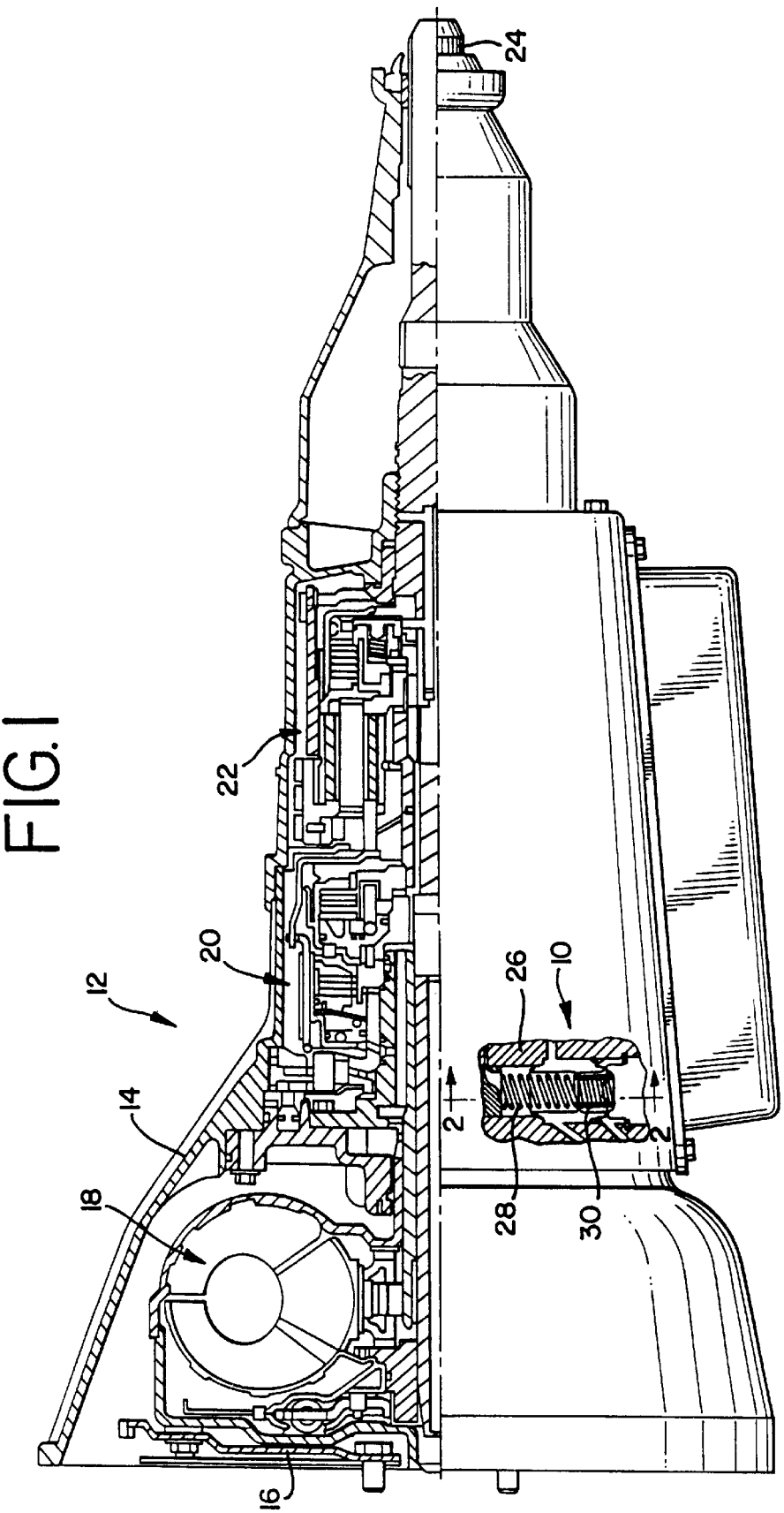
FIG. 1 is a side elevational view, with portions broken away, showing the principal elements of the invention along with an automatic transmission of the invention in which the improved piston is used.

FIG. 1 shows the laser-bonded piston of the invention generally designated 10 to be contained within an automatic transmission generally designated 12. FIG. 1 shows the invention to include a housing 14 for the transmission generally designated 12, a flex plate 16, a torque converter 18, a plurality of gear sets 20, 22, and an output shaft 24. In particular, the 1-2 accumulator piston is disposed in a bore in a shift body generally designated 26, which includes a downwardly biased spring 28, an upwardly biased spring 30, and a movable piston 10 operating between the two.

Referring in particular to FIG. 2, the composite piston 10 is shown to include a reduced diameter cup 32 which includes a radial lip seal 34 bonded to a flange 35 at the open end thereof, and the spring 28 held captive in the cup 32. The second cup generally designated 36, contains a captive spring 30, shown compressed in FIG. 2, and this cup includes a convoluted wall section 38, having an enlarged diameter, two way seal 40 bonded to a flange 39, which forms its end portion.

The cup 36 includes a closed end 42, and plural scallops 44 or the like, permitting entry of oil for the purpose of actuating the piston. The bore 46, which is enlarged to accumulate the larger flange on the piston 10, includes a snap-ring 48, and a piston support 49, having a seal 50 on its end portion 51. The support 49 includes a well 52 and a surrounding ridge 54, which engages and supports the bottom cup 36 when the cup 36 is in its downwardmost position.

The bore 46 includes a pair of inlet ports, a lower port 56 and an upper port 58. The lower port 56 is serviced by a pressure passage 60, and the upper port 58 is serviced by a pressure passage 62. On the opposite side of the bore 46 is an exhaust port 64, serviced by a passage 66 which is connected in use to a line tap. In use, pressure in the port 56 serves to move the piston 10 up, while pressure in the port 58 serves to move the piston 10 down.

Finally, an outlet port 68 and a passage 70 serve the purpose of permitting the oil on the upper side of the piston to return by venting to a clutch housing area. The seal 34 on the flange 35 is positioned in a counterbore 72 of somewhat reduced diameter in respect to the first or principal bore 46. Preferably, a plug 69 in the end of the bore serves as a perch for the upper spring 28, and a contoured opening 71 therein leads to the outlet port 68. Assembly is aided by a taper 74 formed where the principal bore 46 meets a shoulder 70 in the counterbore 72.

The hydraulic accumulator is necessary to modern automatic transmissions. Accumulators are used in parallel to cushion the application of servos and hydraulic clutches. When hydraulic fluid accelerates or changes direction rapidly such as when pressure is applied through a shift valve, it is subject to surging. A rapid surge of hydraulic pressure can cause an "apply" device to vibrate or to engage harshly. This would cause rough shifts and could conceivably damage the transmission.

An accumulator cushions or damps hydraulic pressure surges. This is done by temporarily diverting a part of the fluid in the circuit into a parallel circuit or chamber, in this case having a resiliently movable piston. The diversion allows pressure to increase in the main circuit more gradually (although still in a relatively short time) and provides the desired smooth engagement of the band or clutch with which it is associated in use. In this case, it is the 1-2 shift mechanism.

The 1-2 accumulator thus comprises a pair of back-to-back welded cups or piston halves or the like that are able to move as a unit from one position to another in use. To move the piston upward as shown in FIG. 2, the unit operates as described. The overdrive-drive-1 pressure that was blocked at the 1-2 shift valve in first gear is shifted so that the hydraulic pressure flows through the valve to the intermediate clutch, the 1-2 accumulator, and to the overdrive-servo regulator valve.

As a result, the pressure appearing in the oil thus flows through the line and appears at the port 56. A scallop or relief on the underside of the piston 10 permits oil to fill the cup 36, as well as passing between the seals 40 and 50 and exerting a biasing-apart force on them. This urges the piston in an upward direction, causing flow out the port 58 and the line 62, until the piston 10 reaches the top of its travel. This moves fluid from the region above the piston to a clutch housing area. Whereas there is line pressure in the line 62, the accumulator sees more pressure by reason of filling the entire interior 42 of the cup with oil. This causes the piston to move to its upwardmost position and compresses the spring 28, while relieving the pressure on the spring 30. The port 64 and line 66 are connected to a line tap.

In another situation, an opposite movement of the accumulator piston takes place. In this instance, the line or higher pressure is seen at line 62 and port 58, while the port 56 and the line 60 see a diminished pressure. With this condition, the pressure is greater on the upwardly facing surfaces (FIG. 2) than the downward facing surfaces, and the piston compresses the spring 30 and descends to its low position as shown in FIG. 2.

Referring now to FIGS. 3 and 4, a method of making the unit is shown. Here, the upper cup 32 and the lower cup 36 are shown. The deep draw into a cup 32 is made, following which the radial elastomeric lip seal 34 is bonded to the flange 35. In FIG. 3, the bottom surface 42 of the cup 36 is shown, as is the curl 38 or return upon itself, and the dual lip seal 40 on the flange 39. The scallops 44 are also shown in this illustration. In this instance, the side walls 33, 35 of the upper and lower cups 36, 32 are of the same diameter. Once the cups are held in aligned relation, a laser beam 80 is shown melting the edges of the piston and securing the two halves together along the interface 92 shown in the drawings. The laser welder is the preferred method of welding, using a highly localized beam and little heat outside that concentrated at the welding point.

Figure 5:
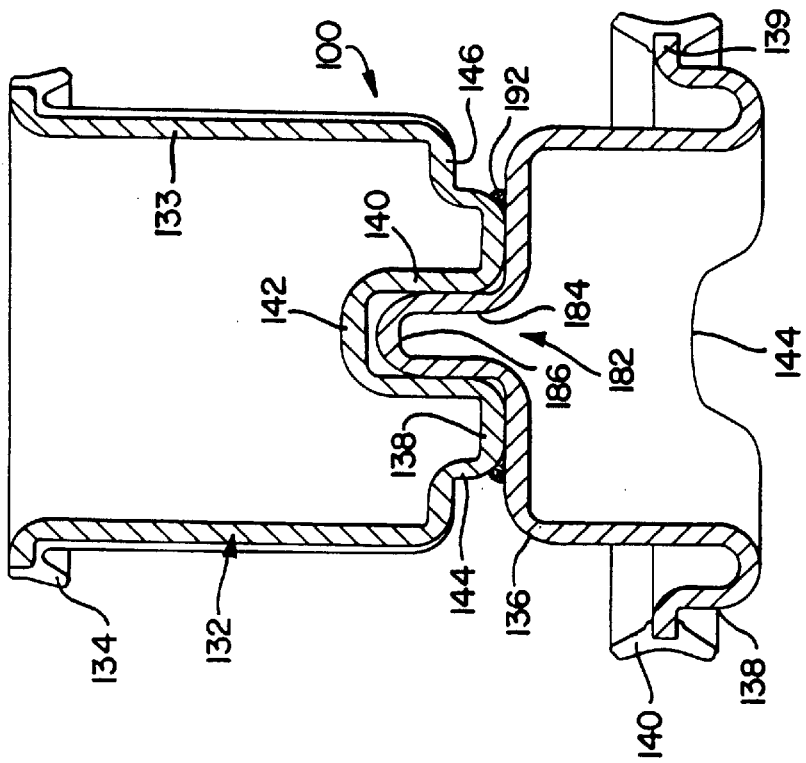
FIG. 5 is a vertical sectional view of a modified form of the invention.

In FIG. 5, an embodiment is shown wherein the cup 136 containing the larger flange 139 contains, in addition to the convoluted portion 138 and the dual lip seal 140, a depressed center section generally designated 182. This section 182 is shown to include a wall section 184 and a bottom section 186 constituting a further draw in the steel. The scallop 144 is illustrated as being in a rounded or out-of-phase position with respect to its counterpart in the other embodiments.

Shown with the cup 136 is the other piston-forming cup 132 having a side wall 133 and a bonded seal 134 affixed to a flange 135. This unit also includes a second draw 142 in the portion into which the nose 186 will protrude. In addition to the bottom wall 138, the cup includes an offsetting center wall 140, and a bottom wall portion 142. In addition, an optional second wall portion 144 is taken from the portion of metal forming the end wall 146. This form of apparatus is used when the centering between the two units is in question, or when a stronger bond is preferred. A weld at the interface 192 is shown. In use, the piston 100 operates in the same manner as its counterpart shown in FIG. 2. The weld 192 is formed on a smaller diameter than in its counterpart in FIG. 2.

Figure 6:
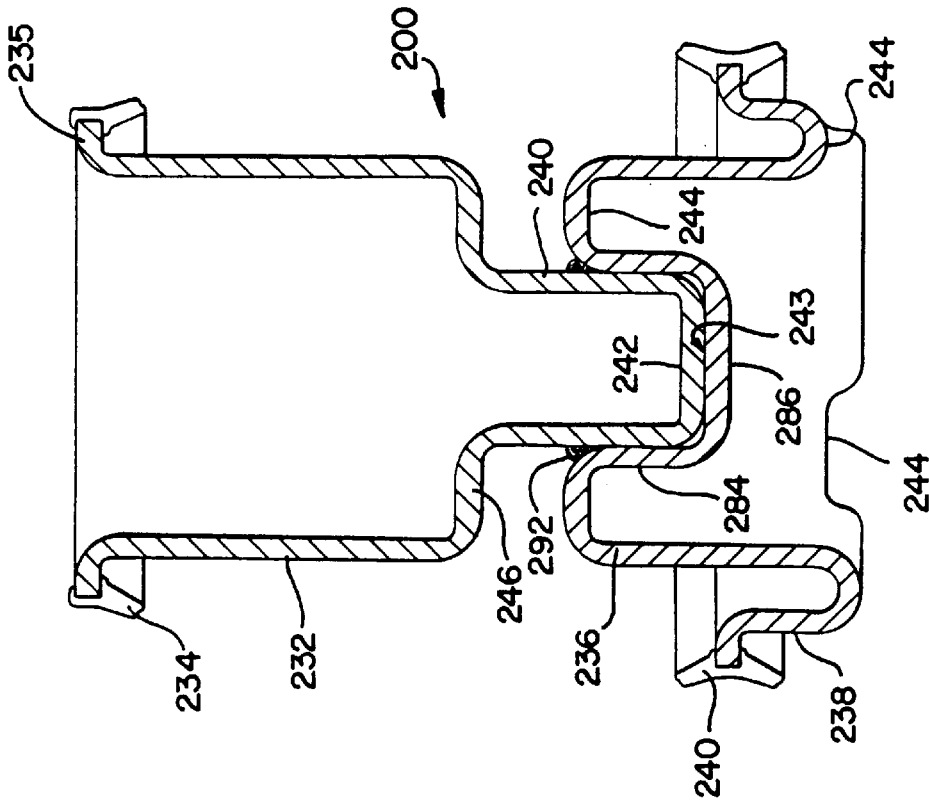
FIG. 6 is a vertical sectional view of a further modified form of the invention.

Referring now to FIG. 6, a still further embodiment of the invention is shown. Here, the smaller diameter portion 232 of the piston 200 having the bonded seal 234 on the flange 235 is shown to include, at the depth of the principal draw 246, a stepped or second draw 242. This presents a reduced diameter nose portion to be accommodated in a pocket in the upper portion of the piston 200. This pocket is generally designated 243, and is shown to be defined by a side wall 284, and a bottom wall 286, formed in the larger diameter portion of the piston 200. In this case, a somewhat different configuration of scallop 244 is shown as being drawn from the stack that formed the curl 238 in the side wall 236.

The dual lip seal 240 is of the same kind as is shown in the other illustrations, and is formed in the same way. The circumference of the portion at which the weld is made, 292 is also somewhat reduced in size, as the opening 243 serves as a pilot diameter for the side wall 246. This insures a close fit between parts and does away with any possible misalignment.

Referring to the material from which the components of the invention are made, the two cups of the invention are preferably made from a steel material. In one respect, the simpler form of the first embodiment is preferred, while the interlocking function may be achieved by the other. The seals are made from a hydrogenated nitrile rubber preferably or may be made from other synthetic elastomers of a suitable type.

It will thus be seen that the present invention provides a new and improved accumulator having a number of advantages and characteristics including those pointed out and others which are inherent in the invention. Several preferred embodiments of the invention being shown by way of example, it is anticipated that several variations may be made from the preferred form of the invention and that such modifications and changes may be made without departing from the spirit of the invention and the scope of the appended claims.

We claim:

1. An accumulator piston for an automatic transmission, said accumulator piston being formed in one piece from two components, said first component being a cup element having a bottom wall, a side wall, and a first radially outwardly extending flange, and bonded to said first flange, a first elastomeric sealing lip having a gradually enlarging diameter, the second component also being a cup element having a bottom wall, a side wall, a skirt of enlarged diameter folded over so as to lie radially outwardly of said cup side wall, and a second radial flange extending outwardly from said skirt, said folded over portion of said cup element having at least one re-entrant portion in said skirt, and, bonded to said second flange, a second elastomeric seal body comprising a pair of sealing lips each extending radially outwardly from said flange and axially outwardly in opposite directions from a point of minimal outer radial diameter, said cup elements being fastened together with their closed ends in abutting relationship so as to form said two-component accumulator piston.

2. An accumulator piston as defined in claim 1, wherein said two cup elements are formed from a steel material by drawing.

3. An accumulator piston as defined in claim 1, wherein said first and second sealing lips are formed from a carboxylated nitrile material.

4. An accumulator piston as defined in claim 1, wherein said cup elements are fastened together by welding.

5. An accumulator piston as defined in claim 1, wherein said cup elements are fastened together by laser welding.

6. An accumulator piston as defined in claim 1, wherein said cup elements further include auxiliary formations nesting with one another to assure concentricity.

7. An accumulator piston as defined in claim 6, wherein said elements are fastened together by welding and said contour of said cups are such that said weld is formed on a smaller diameter than the major diameter of said piston element.

8. An accumulator piston as defined in claim 6, wherein said auxiliary formation in nesting relation are formed by an outwardly extending second draw on said first cup and inwardly extending draw on said second cup.

9. An accumulator piston as defined in claim 6, wherein said auxiliary formation in nesting relation are formed by an outwardly extending second draw on said second cup and inwardly extending draw on said first cup.

10. An automatic transmission and accumulator piston assembly comprising, in combination, an automatic transmission housing having a first bore, an opening in said first bore forming a first outlet port, a second, slightly enlarged bore coaxially aligned with said first bore and having therein at least first and second inlet ports and a third port communicating with a clutch housing, a circumferential groove in said enlarged bore, a snap-ring located in said groove, a piston supporting member held in place by said snap-ring said piston support member including a radially outwardly extending mounting flange and a peripheral lip seal bonded to said flange, and a formation for receiving a compression spring, a first compression spring supported at one of its ends by said formation, and a composite accumulator piston element disposed in said first and second bores, said piston including a first cup body, a skirt lying at least partially radially outside said cup body and axially overlying said cup body, a re-entrant portion in said skirt to permit oil to enter, a radial flange forming the outermost part of said skirt, a double lip seal having portions extending axially from said skirt flange in both axial directions, and into contact with the wall of said second bore, with said first compression spring having its other end received at least partially within said first cup body, and, located at least partially within said first bore, a second cup body and a radially outwardly extending flange portion with a lip seal element bonded to the radially outermost portion thereof and extending into contact with said first bore, said first and second cup bodies being arranged with their closed ends together and being fastened to each other, and a second spring disposed in said first bore between the first cup and the end of said first bore, whereby, in use, said piston is alternatively driven up and down in said bores by pressure appearing at said first and second ports.

11. An automatic transmission and accumulator piston assembly as defined in claim 10, wherein said piston cups are made from a drawn steel material.

12. An automatic transmission and accumulator piston assembly as defined in claim 10, wherein said cups are drawn from a thin steel material and are fastened together by welding.

13. An automatic transmission and accumulator piston assembly as defined in claim 10, wherein said cups are drawn from a thin steel material and are fastened together by laser welding.

14. An automatic transmission and accumulator piston assembly as defined in claim 10, wherein said first and second piston cups further include respectively, formations extending axially inwardly and outwardly in nested relation, thereby insuring that said piston cups, in their assembled relation, abut each other.

15. An automatic transmission and accumulator piston assembly as defined in claim 14, wherein said cups are welded together about a smaller diameter than the diameter of said piston cups.

16. An automatic transmission and accumulator piston assembly as defined in claim 14, wherein said nested relation is formed by an outwardly extending draw on said first cup and an inwardly extending draw on said second cup, said two cups being fastened to each other by welding.

17. An automatic transmission and accumulator piston assembly as defined in claim 14, wherein said nested relation is formed by an inwardly extending draw on said first cup and an outwardly extending draw on said second cup, said two cups being fastened to each other by welding.

* * * * *